(12) United States Patent
Million-Rousseau et al.

(10) Patent No.: US 7,474,904 B1
(45) Date of Patent: Jan. 6, 2009

(54) DEVICE FOR ACQUIRING AND TRANSFERRING DATA CONCERNING PAYMENT MEANS TO A BANKING INSTITUTION

(75) Inventors: Bruno Million-Rousseau, Cassis Cedex (FR); Christian Junker, Deuil la Barre (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/807,544

(22) PCT Filed: Oct. 11, 1999

(86) PCT No.: PCT/FR99/02440

§ 371 (c)(1),
(2), (4) Date: Apr. 13, 2001

(87) PCT Pub. No.: WO00/22582

PCT Pub. Date: Apr. 20, 2000

(30) Foreign Application Priority Data

Oct. 13, 1998 (FR) .................................. 98 12826

(51) Int. Cl.
*H04M 1/00* (2006.01)
(52) U.S. Cl. .................... 455/556.1; 455/406; 455/410; 455/426.1; 455/557; 455/555; 379/114.2; 379/114.17; 379/196; 379/189; 705/35
(58) Field of Classification Search .............. 455/556.1, 455/555, 557, 410, 406, 426.1; 379/196, 379/354, 114.17, 114.02, 114.16; 235/487, 235/381; 705/35
See application file for complete search history.

(56) References Cited

U.S. PATENT DOCUMENTS

| | | | | | |
|---|---|---|---|---|---|
| 5,636,271 | A | * | 6/1997 | Paterno et al. | 379/357.03 |
| 5,694,457 | A | * | 12/1997 | Nixon et al. | 379/100.14 |
| 5,721,768 | A | * | 2/1998 | Stimson et al. | 379/114.16 |
| 5,809,125 | A | * | 9/1998 | Gammino | 379/189 |
| 5,844,218 | A | * | 12/1998 | Kawan et al. | 235/380 |
| 5,854,581 | A | * | 12/1998 | Mori et al. | 235/379 |
| 5,859,419 | A | * | 1/1999 | Wynn | 235/487 |
| 5,886,333 | A | * | 3/1999 | Miyake | 235/380 |
| 5,915,214 | A | * | 6/1999 | Reece et al. | 455/406 |
| 5,988,509 | A | * | 11/1999 | Taskett | 235/487 |
| 6,028,923 | A | * | 2/2000 | Kolb et al. | 379/216.01 |
| 6,134,319 | A | * | 10/2000 | Burg et al. | 379/354 |
| 6,142,369 | A | * | 11/2000 | Jonstromer | 235/380 |
| 6,154,532 | A | * | 11/2000 | Lockhart et al. | 379/143 |
| 6,181,935 | B1 | * | 1/2001 | Gossman et al. | 455/433 |
| 6,233,321 | B1 | * | 5/2001 | Guichard et al. | 379/93.01 |

(Continued)

FOREIGN PATENT DOCUMENTS

EP 0382544 A2 8/1990

(Continued)

*Primary Examiner*—Marceau Milord
(74) *Attorney, Agent, or Firm*—Young & Thompson

(57) ABSTRACT

A device acquires information relating to payment particulars and for transfer of this information to a server center of a banking organization. The device includes an apparatus for reading the payment particulars, a central processing unit to which the reading apparatus is connected, a modem for establishing a telephone link with the server center, and an apparatus for dialing telephone numbers such that the dialing apparatus is associated with the modem.

12 Claims, 2 Drawing Sheets

U.S. PATENT DOCUMENTS

| | | | |
|---|---|---|---|
| 6,424,706 B1 * | 7/2002 | Katz et al. | 379/144.01 |
| 6,577,858 B1 * | 6/2003 | Gell | 455/407 |
| 6,644,403 B2 * | 11/2003 | Pichery et al. | 166/250.11 |
| 6,829,339 B1 * | 12/2004 | Kunugi et al. | 379/114.17 |

FOREIGN PATENT DOCUMENTS

| | | |
|---|---|---|
| EP | 0794651 A1 | 9/1997 |
| EP | 0843290 A2 | 5/1998 |
| FR | 2757005 A1 | 6/1998 |
| WO | WO 9014729 | 11/1990 |
| WO | WO 9746986 | 12/1997 |
| WO | WO 9817045 | 4/1998 |
| WO | WO 9834203 | 8/1998 |

* cited by examiner

DEVICE FOR ACQUIRING AND TRANSFERRING DATA CONCERNING PAYMENT MEANS TO A BANKING INSTITUTION

BACKGROUND OF THE INVENTION

1. Field of the Invention

The present invention relates to a device for acquiring and for transferring information relating to payment means to a banking organization.

2. Description of the Related Art

Conventionally, such devices comprise means for reading the payment means connected to a central processing unit, and means for dialing telephone numbers associated with a modem for establishing a telephone link with the server center.

An exemplary device of this type consists of electronic payment terminals.

These terminals, located at a trader's, make it possible to perform transaction by bank card, securely.

They comprise a fixed base furnished with means of connection to a telephone line and a terminal proper equipped with a card reader and with a keypad making it possible to enter the amount of the transaction to be performed and enabling the card bearer to identify himself/herself.

Electronic payment terminals require the establishment of a telephone link with the server center of a banking organization, on the one hand, to obtain an authorization number in respect of transactions pertaining to sums greater than a predetermined threshold value, currently fixed at FF 600 and, on the other hand, to periodically credit the trader's bank account with the sums corresponding to the transactions performed.

Under certain circumstances, for example in the case of a travelling trader, or when the trader has a stand at a trade show, that is to say in situations in which no telephone socket is available to the trader, it is not possible to obtain, with the aid of the electronic payment terminal, a prior authorization number and to credit his account with the takings received.

A trader can also be confronted with this same problem when he wishes to use a device for reading and verifying checks which also requires the establishing of a telephoning link with a banking organization.

Reference may also be made to the document WO-A-9520195 which describes a device in accordance with the preamble of claim 1 but which poses transmission reliability problems.

BRIEF SUMMARY OF THE INVENTION

The aim of the invention is to alleviate these drawbacks.

Its subject is therefore a device for acquiring information relating to payment means and for transferring this information to a server center of a banking organization, of the above-mentioned type, in which the means for dialing telephone numbers and the associated modem consist of elements of wireless telephony circuits, characterized in that the device furthermore comprises second means for dialing telephone numbers and a second modem associated with these means, consisting of elements of wired telephony circuits, and a switching facility for selectively placing the central unit in communication with the first or second means for dialing telephone numbers.

The expression "element of wireless telephony circuit" is understood to mean, within the framework of the present description, circuits of a mobile or cellular telephone apparatus, that is to say, of a telephone set communicating over the airwaves with a relay or base station covering a geographical zone of the public telephone network.

The device for acquiring and for transferring information relating to payment means, according to the invention, can furthermore comprise one or more of the following characteristics, taken in isolation or according to all technically possible combinations:

- the switching facility consists of a switching facility which can be actuated manually by a user;
- the switching facility comprises voltage detection means provided in a circuit for interfacing with a switched telephone network;
- said first means for dialing telephone numbers and the associated modem are disposed in a box separate from the remainder of the device, the box comprising, connected at the input of these latter, a circuit for emulating a switched telephone network associated with means for detecting telephone numbers dialed by said second means for dialing and means for matching the speeds of transmission of the data transmitted between the first and second means for dialing telephone numbers;
- the matching means consist of means of temporary storage of the data;
- the emulating circuit is connected to the second means for dialing telephone numbers by a wireless link, in particular an infrared link of the IrDA type;
- the first means for dialing telephone numbers are connected to a wireless telephone set;
- the first means for dialing telephone numbers are connected to the telephone set by a wireless link, in particular an infrared link of the IrDA type;
- it constitutes an electronic payment terminal;
- it constitutes a device for reading and verifying checks.

BRIEF DESCRIPTION OF THE DRAWING FIGURES

Other characteristics and advantages will emerge from the following description, which are given merely by way of example, and with reference to the appended drawings in which.

DETAILED DESCRIPTION OF THE PREFERRED EMBODIMENTS

Figure 1:
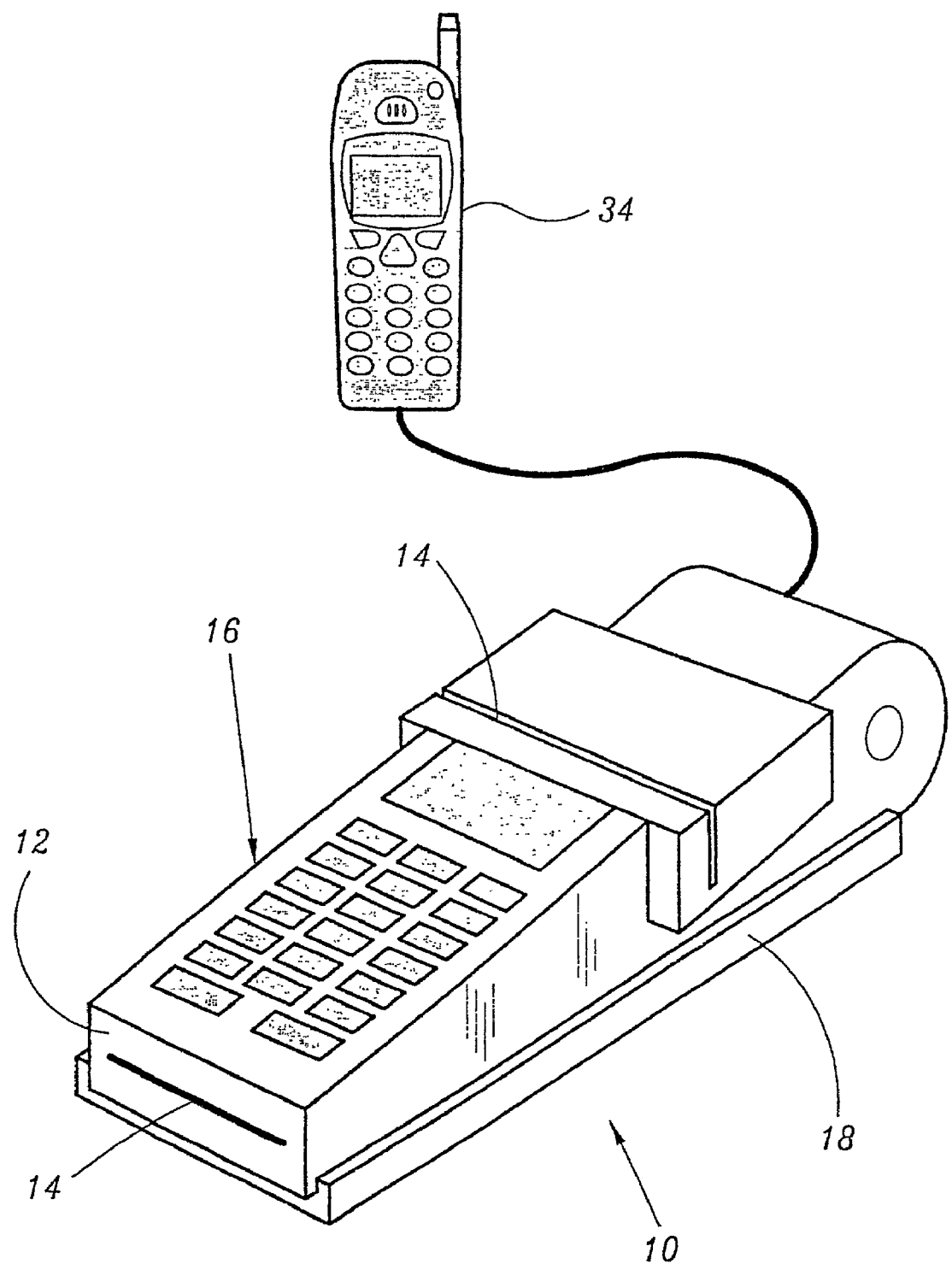
FIG. 1 is a perspective diagrammatic view of an exemplary embodiment of a device for acquiring and transferring information, according to the invention.

Represented in FIG. 1 is a device for acquiring and transferring information relating to payment means.

In the exemplary embodiment represented in this figure, the device, designated by the general numerical reference 10, consists of an electronic payment terminal for, as is conventional, reading information contained in a payment bank card (not represented) such as the bank references and the name of the card bearer and for transferring this information to the server center of a banking organization, accompanied by information corresponding to a transaction to be performed.

The device 10 comprises, as is conventional, a terminal proper 12 equipped with readers 14 for chip and magnetic-strip bank cards, and a keypad 16 making it possible to manually enter the data corresponding to the transactions to be performed, and a base 18 on which the terminal 12 rests, in the idle position.

Figure 2:
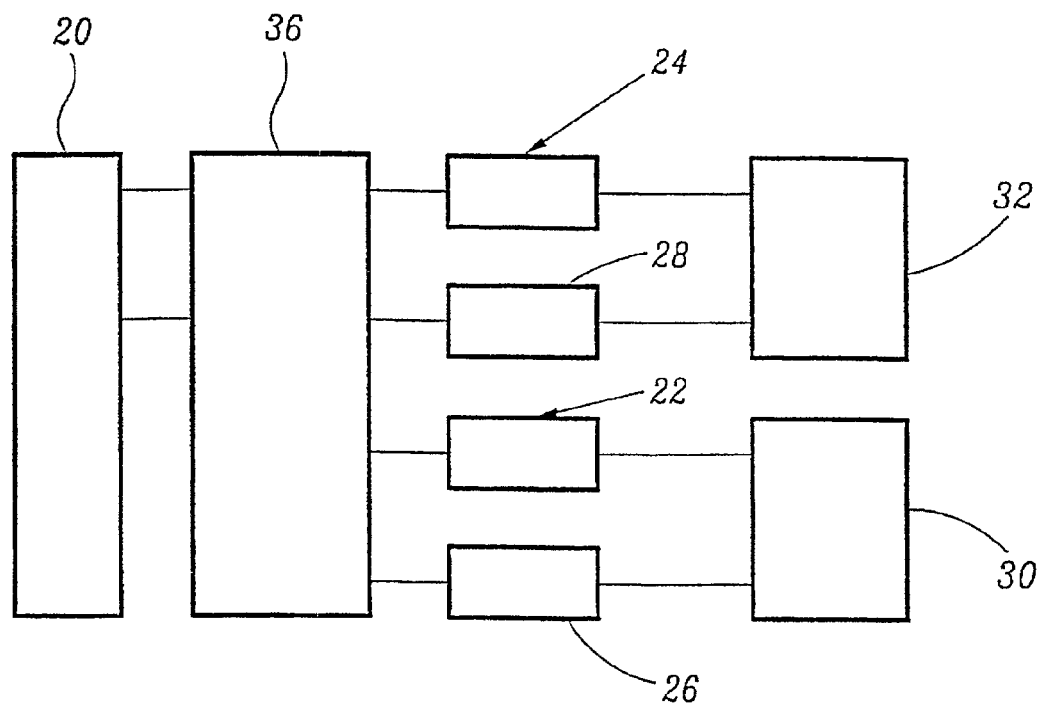
FIG. 2 is a schematic diagram of the device of FIG. 1.

As may be seen in FIG. 2, the base 18 comprises a central data processing unit 20 to which are connected first means for dialing telephone numbers 22 and second means for dialing telephone numbers 24.

The first and second means for dialing telephone numbers 22 and 24 are each associated with a modem, 26 and 28 respectively, catering, on the one hand, on transmission, for the modulation of the data emanating from the processing unit 20 with a view to its transmission over telephone networks and, on the other hand, on reception, for the demodulation of the data received from the banking organization with a view to its transmission to the processing unit 20.

The first, 22, and second 24, means for dialing telephone numbers are means of conventional type, appropriate for the use envisaged. They will therefore not be described in detail.

It will however be noted that the first means 22 for dialing telephone numbers and the modem 26 are made from elements of wireless telephony circuits, that is to say, they are able to cater for the keying and transmission of the numerical data over a "mobile" or "wireless" telephony network, being thus able as a function of the standard used for the transmission of the data.

It will also be noted that the second means 24 for dialing telephone numbers consist of elements of telephone circuits of the DTMF type allowing dialing on the public switched telephone network.

Two interface circuits, 30 and 32, respectively connected to the first and second means for dialing telephone numbers and to the associated modem cater for the connection of the device, on the one hand, to the wireless telephony telephone network and, on the other hand, to the switched telephone network.

Specifically, the first interface circuit 30 is intended to allow the plugging in of a cellular telephone set 34 (FIG. 1), whilst the second interface circuit 32 will be connected up directly to a telephone line.

The circuit of the base is completed with a switching circuit 36 for selectively placing the data processing unit 20 in communication with the first or second means for dialing telephone numbers with a view to exchanging information with a server center, after establishing a telephone communication, either via the switched telephone network, of via the "mobile" telephony network.

According to a first embodiment, the switching circuit 36 consists of a selector which can be manually actuated by a user, for example by means of a pushbutton, as a function of the chosen mode of transmission.

As a variant, the switching circuit 36 caters for detection of the voltage present at the level of the second interface circuit 32, that is to say at the level of the zone of connection thereof to the switched telephone network, by using an appropriate voltage detector, and places the processing unit 20 in communication with the switched telephone network in the event of detecting a voltage equal to 48 V for France for example, corresponding to the voltage conventionally present on a telephone line, and simultaneously disconnects the unit 20 from the first interface circuit 30.

In the exemplary embodiment just described with reference to FIG. 2, the assembly of elements allowing the establishment of a wireless telephone link, by way of a cellular telephone set, with the server center of a banking organization are built into the base, to which the cellular telephone set will be linked.

It would be possible, as a variant, to build the telephone set into the base, by furnishing the base with all the telephone circuits required for establishing a telephone link.

Figure 3:
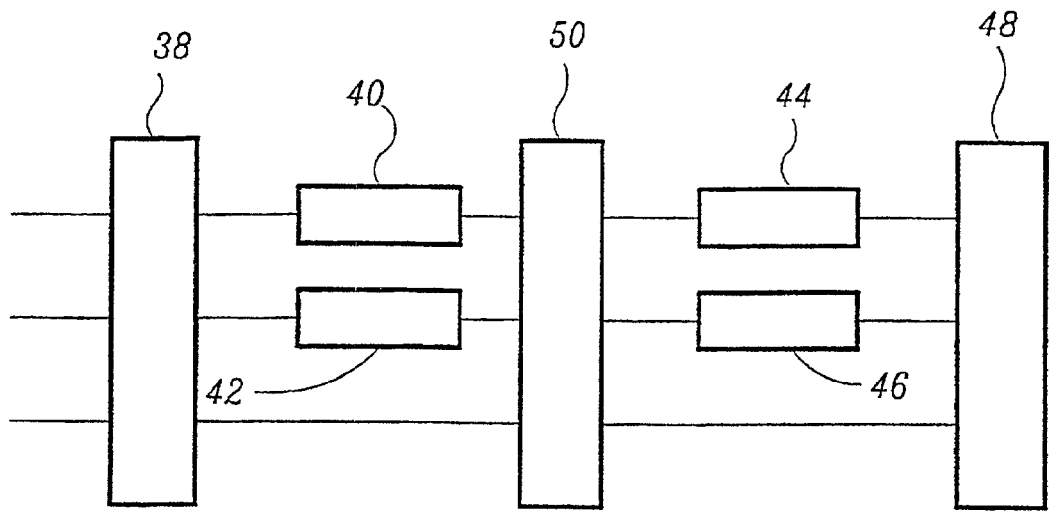
FIG. 3 is a schematic diagram showing the make-up of another embodiment of a device for acquiring and transferring information relating to payment means.

According to another exemplary embodiment, represented in FIG. 3, the first means for dialing telephone numbers and the associated modem are incorporated into a separate box which will be plugged into the telephone socket of the base of a conventional electronic payment terminal, the second means for dialing telephone numbers and the modem being disposed in the base.

In this figure, elements identical to those of FIG. 2 bear the same reference numbers.

As may be seen in this figure, according to this exemplary embodiment, the device comprises, at input, a circuit 38 emulating the fixed network, of the conventional type, catering for reception of the data delivered by the base 18 of the electronic payment terminal 10, and connected to a circuit for detecting telephone numbers dialed by the means for dialing telephone numbers built into the base, designated by the general numerical reference 40 and which are associated with a modem 42, likewise of conventional type.

The detection circuit 40 and the modem 42 are connected to means 44 for dialing telephone numbers and to a corresponding modem 46, which are identical to the first means for dialing telephone numbers 22 and to the modem 26 of FIG. 2, themselves connected to an interface circuit 48 to which a cellular telephone set (not represented) will be connected.

A circuit 50 for matching the speeds of transmission of the data transmitted between the first and second means for dialing telephone numbers, disposed respectively in the separate box and in the base, is disposed, between, on the one hand, the detection circuit 40 and the associated modem 42 and, on the other hand, the circuit for dialing telephone numbers 44 and the associated modem 46.

This circuit 50 incorporates means of temporary storage of the data transmitted between the base and the mobile telephone network so as to match the speed of transmission of the data conveyed over the fixed switched telephone network to those of the mobile telephone network.

It will be appreciated that this exemplary embodiment makes it possible to transmit data toward a banking organization, using a cellular telephone whilst also using a payment terminal of conventional type.

In the exemplary embodiments described above, the cellular telephone set has been regarded as being connected, by means of a wire link, to the corresponding interface.

It would however be possible, as a variant, to cater for communication between the cellular telephone and the device by using a wireless link, for example an infrared link of the IrDA type.

Likewise, it would also be possible, in the exemplary embodiment described with reference to FIG. 3, to envisage the use of such a wireless link between the electronic payment terminal and the box.

The invention is not limited to the embodiments described, in which the device consists of an electronic payment terminal.

Indeed, the device can also be contrived in the form of a device for reading and verifying checks so as to read the references which a check bears and to transmit them towards a banking organization with a view to verifying, for example, that the check is not subject to a stop instruction.

The invention claimed is:

1. A device for acquiring information relating to payment means and for transferring this information to a server center of a banking organization, the device comprising:
   means for reading the payment means,
   a central processing unit to which the reading means are connected,
   a first modem for establishing a first telephone link between the central processing unit and the server center, first means for dialing telephone numbers, said first dialing means being associated with the first modem, wherein the first means for dialing telephone numbers and the associated first modem consist of elements of wired telephony circuits, so that the device is able to be connected to a switched telephone network for establishing the first telephone link, a second modem for establishing a second telephone link between the central processing unit and the server center, second means for dialing telephone numbers, said second dialing means being associated with the second modem, wherein the second means for dialing telephone numbers and the associated second modem consist of elements of wireless telephony circuits, so that the device is able to be connected to a wireless telephony network for establishing the second telephone link, and a switching facility for selectively placing the central processing unit in communication with the first or second means for dialing telephone numbers such that the central processing unit may be selectively connected to the server center via the first telephone link of the second telephone link.

2. The device as claimed in claim 1, characterized in that the switching facility (36) consists of a switching facility which can be actuated manually by a user.

3. The device as claimed in claim 1, characterized in that the switching facility (36) comprises voltage detection means provided in a circuit for interfacing with a switched telephone network.

4. The device as claimed in claim 1, characterized in that it constitutes an electronic payment terminal.

5. An add-on system for being connected to a device for acquiring information relating to payment means and for transferring this information to a server center of a banking organization, the device comprising:

means for reading the payment means, a central processing unit to which the reading means are connected, a first modem for establishing a telephone link with the server center, first means for dialing telephone numbers associated with the first modem, wherein the first means for dialing telephone numbers and the associated first modem include elements of wired telephony circuits, so that the device is able to be connected to a switched telephone network for establishing the first telephone link, said add-on system comprising, in a box separated from the device:

a circuit for emulating a switched telephone network, intended to be connected to the device, means for detecting telephone numbers dialed by said first dialing means, a second modem associated with the detecting means, so as to communicate with the first modem, a third modem for establishing a second telephone link with the server center, said third modem being connected to the second modem, second means for dialing telephone numbers, said second dialing means being associated with the third modem, wherein the second means for dialing telephone numbers and the associated third modem include elements of wireless telephony circuits, so that the third modem is able to be connected to a wireless telephony network for establishing the second telephone link, and means for matching the speeds of transmission of the data transmitted between the first and second means for dialing telephone numbers.

6. The add-on system as claimed in claim 5, wherein the matching means consist of means of temporary storage of the data.

7. The add-on system as claimed in claim 5, comprising a wireless link for connecting the emulating circuit to the first dialing means of the device.

8. The add-on system as claimed in claim 7, wherein said wireless link comprises an infrared link of the IrDA type.

9. The add-on system as claimed in claim 5, comprising a wireless telephone set connected to the third means for dialing telephone numbers.

10. The add-on system as claimed in claim 9, comprising a wireless link connecting the first means for dialing telephone numbers to the telephone set.

11. The add-on system as claimed in claim 10, wherein said wireless link comprises an infrared link of the IrDA type.

12. A system for acquiring information relating to payment means and for transferring this information to a server center of a banking organization, the system comprising a device comprising:

means for reading the payment means, a central processing unit to which the reading means are connected, a first modem for establishing a telephone link with the server center, first means for dialing telephone numbers associated with the first modem, wherein the first means for dialing telephone numbers and the associated first modem include elements of wired telephony circuits, so that the device is able to be connected to a switched telephone network for establishing the first telephone link, an add-on system connected to the device in place of the switched telephone network, said add-on system comprising, in a box separated from the device:

a circuit for emulating a switched telephone network, connected to the device, means for detecting telephone numbers dialed by said first dialing means, a second modem associated with the detecting means, so as to communicate with the first modem, a third modem for establishing a second telephone link with the server center, said third modem being connected to the second modem, second means for dialing telephone numbers, said second dialing means being associated with the third modem, wherein the second means for dialing telephone numbers and the associated third modem include elements of wireless telephony circuits, so that the third modem is able to be connected to a mobile phone for establishing the second telephone link, and means for matching the speeds of transmission of the data transmitted between the first and second means for dialing telephone numbers.

* * * * *